US010790753B2

(12) United States Patent
Koo et al.

(10) Patent No.: US 10,790,753 B2
(45) Date of Patent: Sep. 29, 2020

(54) REDUCED VOLTAGE SWITCHING OF A MAIN SWITCH IN FLYBACK POWER CONVERTERS

(71) Applicant: SEMICONDUCTOR COMPONENTS INDUSTRIES, LLC, Phoenix, AZ (US)

(72) Inventors: Gwanbon Koo, Sunnyvale, CA (US); Youngbae Park, Taipei Zhongsan (TW); Taesung Kim, Seoul (KR); BongGeun Chung, Siheung-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/128,324

(22) Filed: Sep. 11, 2018

(65) Prior Publication Data

US 2020/0083811 A1 Mar. 12, 2020

(51) Int. Cl.
*H02M 3/335* (2006.01)
*H02M 1/00* (2006.01)

(52) U.S. Cl.
CPC ..... *H02M 3/3353* (2013.01); *H02M 3/33507* (2013.01); *H02M 2001/0009* (2013.01); *H02M 2001/0058* (2013.01)

(58) Field of Classification Search
CPC ............... H02M 3/335; H02M 3/3353; H02M 3/33507; H02M 3/33523; H02M 3/33569;
(Continued)

(56) References Cited

U.S. PATENT DOCUMENTS 5,786,990 A * 7/1998 Marrero ............. H02M 3/3353
363/16
6,359,795 B1 * 3/2002 Amantea ............. H02M 1/4258
363/21.01
(Continued)

FOREIGN PATENT DOCUMENTS

CN 101572490 B 5/2012

OTHER PUBLICATIONS

Huang, Xiucheng et al.; "Design Consideration of MHz Active Clamp Flyback Converter with GaN Devices for Low Power Adapter Application," Apr. 3-5, 2016, 21 Pages, T2.2, Virginia Tech Center for Power Electronics Systems, Blacksburg, VA.

*Primary Examiner* — Thienvu V Tran
*Assistant Examiner* — Shahzeb K Ahmad
(74) *Attorney, Agent, or Firm* — Dickinson Wright PLLC; Mark E. Scott

(57) ABSTRACT

Reduced voltage switching of a main switch in flyback power converters. At least some example embodiments are methods including: storing energy in a field associated with a secondary winding of a transformer, the secondary winding arranged for flyback operation within a secondary circuit of the power converter; charging a capacitor coupled to an auxiliary winding of the transformer; discharging the energy in the field associated with the secondary winding to provide an output voltage of the power converter; and when the electrical current flowing through the secondary winding reaches a predetermined low level reducing voltage across a main switch in a primary circuit of the power converter by coupling the capacitor to the auxiliary winding to create a voltage on a primary winding of the transformer.

17 Claims, 10 Drawing Sheets

(58) Field of Classification Search
CPC ......... H02M 3/33576; H02M 3/33584; H02M 3/337; H02M 2001/0009; H02M 2001/0058; H02M 1/42; H02M 1/4241; H02M 2007/4815
See application file for complete search history.

(56) References Cited

U.S. PATENT DOCUMENTS

| | | | |
|---|---|---|---|
| 10,135,348 B2* | 11/2018 | Hsiao ................ | H02M 3/33546 |
| 2004/0070997 A1* | 4/2004 | Hung ................ | H02M 3/33561 |
| | | | 363/21.06 |
| 2007/0274105 A1* | 11/2007 | Osaka ............... | H02M 3/33569 |
| | | | 363/21.02 |
| 2013/0155728 A1* | 6/2013 | Melanson ............... | H05B 47/10 |
| | | | 363/21.16 |
| 2013/0279205 A1* | 10/2013 | Keung .............. | H02M 3/33523 |
| | | | 363/21.02 |
| 2016/0329814 A1* | 11/2016 | Fahlenkamp ..... | H02M 3/33523 |
| 2018/0034359 A1* | 2/2018 | Chen .................... | H02M 1/083 |
| 2018/0241299 A1* | 8/2018 | Jitaru ................ | H02M 1/4258 |
| 2019/0199223 A1* | 6/2019 | Lin ....................... | H02M 1/083 |
| 2019/0222131 A1* | 7/2019 | King ................ | H02M 3/33592 |

* cited by examiner

REDUCED VOLTAGE SWITCHING OF A MAIN SWITCH IN FLYBACK POWER CONVERTERS

CROSS-REFERENCE TO RELATED APPLICATIONS

Not Applicable.

BACKGROUND

Active clamp circuits in flyback power converters use two electrical switches (e.g., field effect transistors or FETS) in the primary circuit: a primary switch; and a clamp switch that selectively couples a clamp circuit to the switch node of the primary circuit. Based on a resonance with magnetizing inductance of the primary winding, a capacitance of the clamp circuit, and a parasitic drain-to-source capacitance of the primary switch, it is possible to discharge the parasitic capacitance of the primary switch prior to the next energy storage cycle. In other words, zero-volt switching (ZVS) may be achieved using active clamp circuits. ZVS reduces switching losses, and also reduces electromagnetic interference signals.

BRIEF DESCRIPTION OF THE DRAWINGS

For a detailed description of example embodiments, reference will now be made to the accompanying drawings in which.

DEFINITIONS

Figure 1:
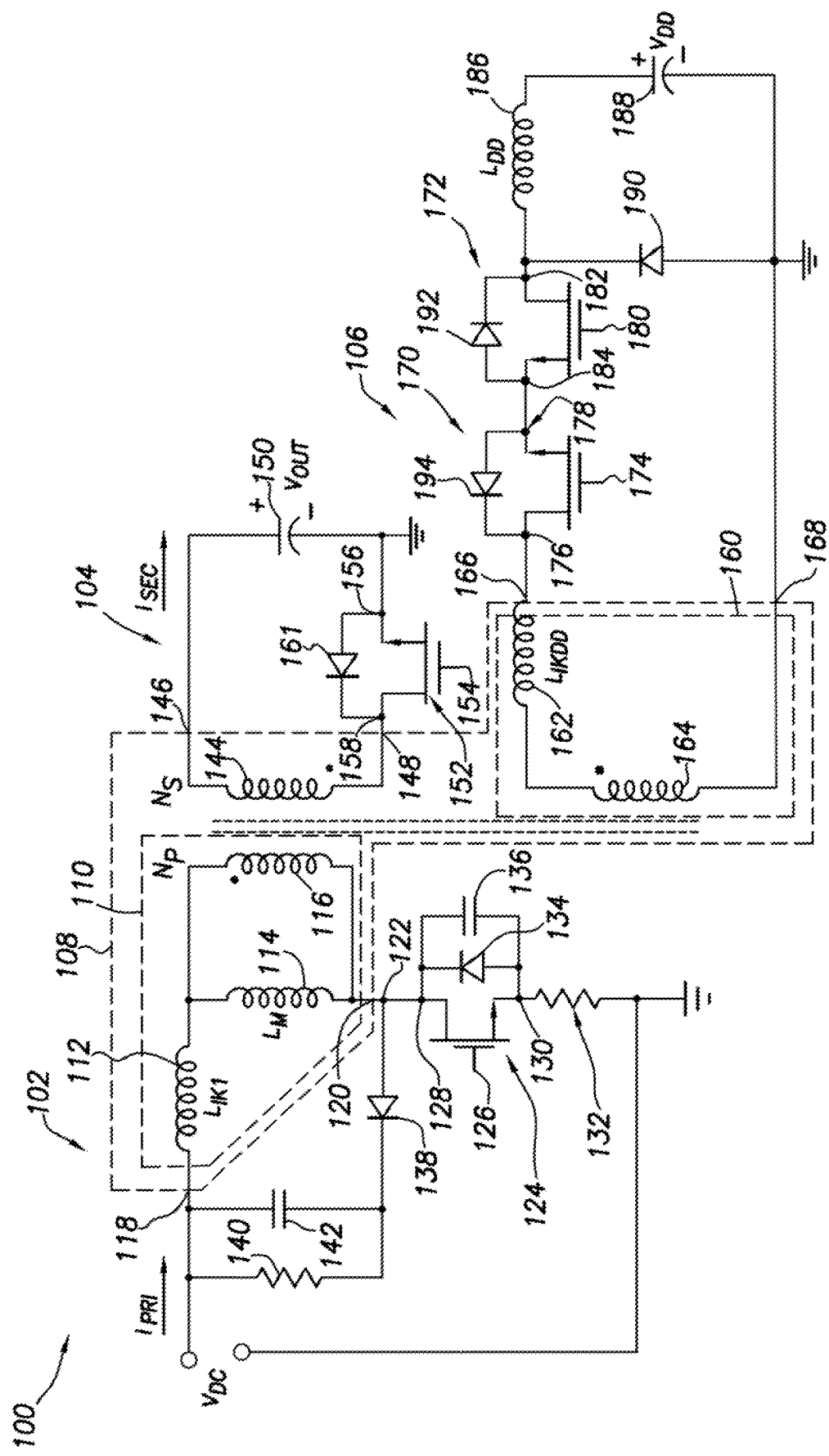
FIG. 1 shows a power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Controller" shall mean individual circuit components, an application specific integrated circuit (ASIC) constructed on a substrate, a microcontroller constructed on a substrate (with controlling software stored on the substrate), a field programmable gate array (FPGA), or combinations thereof, configured to read signals and take action responsive to such signals.

In relation to electrical devices, the terms "input" and "output" refer to electrical connections to the electrical devices, and shall not be read as verbs requiring action. For example, a controller may have a gate output and one or more sense inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Power converters using active clamp circuits to achieve zero-volt switching (ZVS) suffer several drawbacks. For example, electrical currents flowing in the primary circuit to achieve the clamping and ZVS are high, resulting in high conduction losses. Further still, the clamp field effect transistor (FET) carries significant electrical current, and thus not only increases the bill of material (BOM) count, but also increases cost.

Other example flyback systems attempt to achieve ZVS operation of the primary FET by a temporary reversal of roles of the primary circuit and the secondary circuit. That is, after the current through the secondary winding ceases in the flyback operation, the synchronous rectifier (SR) FET again becomes conductive to couple the output voltage to the secondary winding to charge the field associated with the primary winding (configured in a flyback arrangement because the primary switch is non-conductive). The energy stored in the field associated with the primary winding is then discharged (when the SR FET again becomes non-conductive), which drains the parasitic capacitance of the primary switch to achieve ZVS. Again, however, conduction losses are high, and the build-up time for negative current in the secondary side to achieve ZVS limits operating frequency of the system. Moreover, performing ZVS based on the SR FET is calculation intensive, and forces the ZVS calculations to be performed by the secondary controller.

Various example embodiments are directed to reduced voltage switching of a main switch in flyback power converters. More particularly, example embodiments are directed to power converters that achieve ZVS, with the power converter having only a single switch in the primary circuit and without using the SR or secondary switch in the secondary circuit to draw energy from the power converter output. Further still, example embodiments are directed to creating a resonance between the drain-to-source capacitance of the main FET and an inductance disposed in an auxiliary circuit across the transformer. The specification first turns to an example power converter to orient the reader.

FIG. 1 shows a power converter 100 in accordance with at least some embodiments. In particular, the power converter 100 comprises a primary circuit 102, a secondary circuit 104, and an auxiliary circuit 106. The primary circuit 102 receives a direct current (DC) input voltage $V_{DC}$, such as from a rectifier circuit (not specifically shown). The $V_{DC}$ is applied to a transformer 108, and specifically a primary winding 110 of the transformer 108. For reasons that will become clear below, the primary winding 110 expressly shows a leakage inductance $L_{lk1}$ 112, a magnetizing inductance $L_M$ 114, and an ideal winding 116. It will be understood that the primary winding 110 does not contain separate inductances as shown; rather, the operation of the primary winding 110 can be modeled by way of the presence of the leakage inductance $L_{lk1}$ 112, the magnetizing inductance $L_M$ 114, and ideal winding 116. The primary winding 110 defines a first lead 118 and a second lead 120. The first lead 118 couples to the input voltage $V_{DC}$, and the second lead 120 defines a switch node 122. The remaining windings of the transformer 108 will be discussed in relation to their respective circuits (e.g., secondary circuit 104, and auxiliary circuit 106).

The primary circuit 102 further comprises a main switch 124 illustratively shown as a FET (and hereafter just main FET 124). The main FET 124 defines a control input or gate 126, a drain or first connection 128, and a source or second connection 130. The first connection 128 couples to the second lead 120 of the primary winding 110, and thus further defines the switch node 122. The second connection 130 couples to ground, and in the example system shown the second connection 130 couples to ground through an optional current sense resistor 132. The example main FET 124 has a body diode 134 coupled from source to drain, and the main FET 124 also has parasitic capacitance modelled as capacitor 136 coupled across the source and drain (hereafter just parasitic capacitance 136).

The example primary circuit 102 further comprises a snubber circuit in the form a diode 138 having its anode coupled to the switch node 122, and a cathode. The cathode of the diode 138 couples to a parallel resistor-capacitor (RC) circuit comprising resistor 140 coupled in parallel with capacitor 142. The opposite end of the RC circuit couples to the input voltage $V_{DC}$.

Still referring to FIG. 1, the secondary circuit 104 comprises a secondary winding 144 of the transformer 108. The secondary winding 144 would likewise have magnetizing inductance and leakage inductance, but such are not shown so as not to unduly complicate the discussion. The secondary winding 144 defines a first lead 146 and a second lead 148. The first lead 146 couples to an output capacitor 150 and thus the output voltage VOUT. The secondary circuit 104 further comprises a synchronous rectifier or secondary switch 152 illustratively shown as a FET (hereafter just secondary FET 152). The secondary FET 152 defines a gate or control input 154, a source or first connection 156, and a drain or second connection 158. The first connection 156 couples to return or common on the secondary circuit 104. The second connection 158 couples to the second lead 148 of the secondary winding 144. The example secondary FET 152 has a body diode 161 coupled from source to drain. The voltage and currents created by the secondary winding 144 are related in polarity to the voltages and currents of the primary winding 116 as shown by the "dot" convention within the drawing. Thus, the secondary winding 144 and secondary FET 152 are shown in an arrangement for flyback operation within the secondary circuit 104 of the power converter. The arrangement is merely an example, and other flyback arrangements may be constructed (e.g., by moving the secondary FET 152 to couple between first lead 146 and the output voltage VOUT).

The auxiliary circuit 106 comprises an auxiliary winding 160 of the transformer 108. Again for reasons that will become clear below, the auxiliary winding 160 expressly shows a leakage inductance $L_{lkDD}$ 162 and an ideal winding 164 (the magnetizing inductance not specifically shown). It will be understood that the auxiliary winding 160 does not contain separate inductances as shown; rather, the operation of the auxiliary winding 160 can be modeled by way of the presence of the leakage inductance $L_{lkDD}$ 162 and ideal winding 164. The auxiliary winding 160 defines a first lead 166 and a second lead 168. The second lead 168 couples to ground (e.g., the same ground as the primary circuit 102). In the example system, the first lead 166 of the auxiliary winding 160 couples to two back-to-back electrically controlled switches 170 and 172 illustratively shown as FETS (and thus hereafter just charge control FET 170 and resonance FET 172). In particular, charge control FET 170 defines a control input or gate 174, a drain or first connection 176, and a source or second connection 178. The resonance FET 172 defines a control input or gate 180, a drain or first connection 182, and a source or second connection 184. In the example auxiliary circuit 106 the first connection 176 of the charge control FET 170 couples to the first lead 166 of the auxiliary winding 160. The second connection 178 of the charge control FET 170 couples to the second connection 184 of the resonance FET 172.

The example auxiliary circuit 106 further comprises an inductor $L_{DD}$ 186 coupled in series with a capacitor 188, and a clamping diode 190 coupled in parallel with the inductor 186 and capacitor 188. In particular, the first connection 182 of the resonance FET 172 couples to a first connection of the inductor 186 and the cathode of the diode 190. The anode of the diode 190 couples to ground (e.g., again, the same ground as the primary circuit 102), as does the second connection of the capacitor 188. In some example systems, the voltage created and stored by the auxiliary circuit 106 on the capacitor 188 is the operation voltage or $V_{DD}$ used to power the primary controller (not specifically shown in FIG. 1, but discussed more below).

Figure 2:
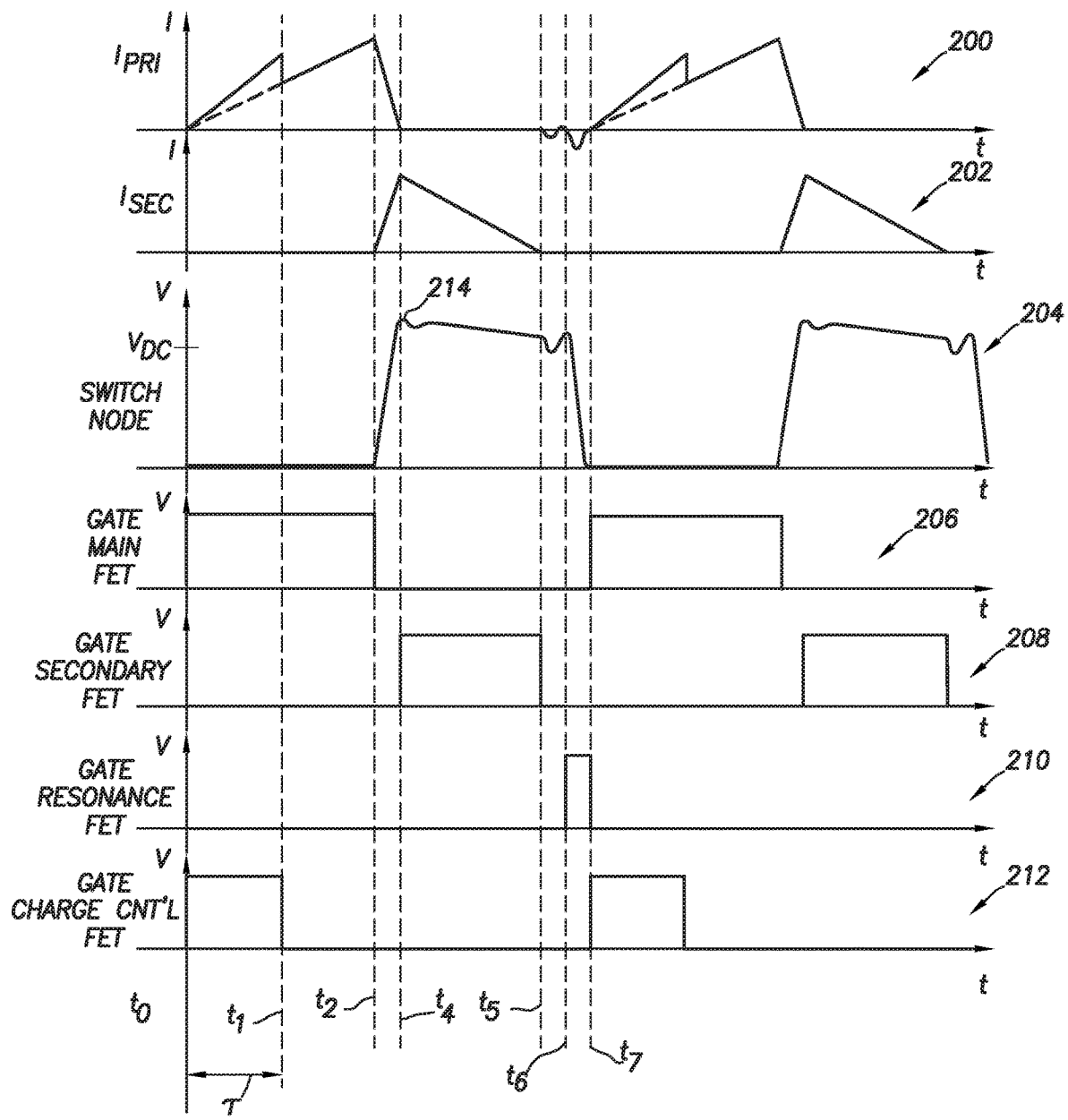
FIG. 2 shows a timing diagram in accordance with at least some embodiments.

FIG. 2 shows a timing diagram in accordance with at least some embodiments. In particular, FIG. 2 shows: a plot 200 of current in the primary circuit 102 (i.e., $I_{PRI}$) as a function of time; a plot 202 of current in the secondary circuit 104 (i.e., $I_{SEC}$) as a function of corresponding time; a plot 204 of voltage at the switch node 122 (FIG. 1) as a function of corresponding time; a plot 206 of voltage at the gate of the main FET 124 (FIG. 1) as a function of corresponding time; a plot 208 of voltage at the gate of the secondary FET 152 (FIG. 1) as a function of corresponding time; a plot 210 of voltage at the gate of the resonance FET 172 (FIG. 1) as a function of corresponding time; and a plot 212 of voltage at the gate of the charge FET 170 (FIG. 1) as a function of corresponding time. The time periods shown in FIG. 2, though corresponding, are not necessarily to scale. The specification now turns to a description of the operation of the example power converter 100 of FIG. 1, the description referring simultaneously to FIGS. 1 and 2.

Consider for purposes of explanation that at time t0 the gate of main FET 124 is asserted as shown by plot 206. Asserting the gate of the main FET 124 makes the main FET 124 conductive thereby creating a primary current $I_{PRI}$ (plot 200) in the primary winding 110. Because of the flyback arrangement of the secondary circuit 104, primary current flowing in the primary winding 110 acts to store energy in a field associated with the secondary winding 144 of the secondary circuit 104 (though no current flows as shown by plot 202). Simultaneously with creating primary current in the primary winding 110 and storing energy in the field associated with the secondary winding 144, the primary current also creates a voltage on the auxiliary winding 160 with a polarity in conformance with the "dot" convention shown in FIG. 1. As shown by plot 212, in the example method the charge control FET 170 of the auxiliary circuit 106 is made conductive at time t0 contemporaneously with the main FET 124 being made conductive. Making the charge control FET 170 conductive enables current to flow through the charge control FET 170, through the body diode 192 of the resonance FET 172, through the inductor $L_{DD}$ 186, and to the capacitor 188. Thus, making conductive the charge control FET 170 (during periods of time when the main FET 124 is also conductive) results in charging the capacitor 188 coupled to the auxiliary winding 160 of the transformer 108.

In the example shown in FIG. 2, the charge control FET 170 is conductive between times t0 and t1, while the main FET 124 is conductive between times t0 and t2. Thus, in some cases, and as shown, the conductive state of the charge control FET 170 is shorter than the conductive state of the main FET 124. In other cases, the conductive state of the charge control FET 170 may begin later than the conductive state of the main FET 124. For example, the charge control FET 170 could be made conductive some period of time after the main FET 124 is made conductive, and then made non-conductive before the main FET 124 is made non-conductive. Further, the charge control FET 170 could be made conductive after the main FET 124 is made conductive, and then made non-conductive simultaneously with the main FET 124. In example embodiments, the period of time τ that the charge control FET 170 is conductive (e.g., between t0 and t1 in plot 212) may be controlled to control the voltage developed across the capacitor 188. For example, if the power converter 100 of FIG. 1 is a travel adapter that can operate with a range of input voltages (e.g., 90 Volts AC to 264 V AC), the power converter 100 may adjust period of time τ to control the voltage $V_{DD}$ applied to the capacitor 188 (e.g., 5V), which again may provide operational power to components of a primary controller (discussed more below). Stated differently, the voltage $V_{DD}$ developed on the capacitor 188 may be controlled by controlling the duty cycle of the control signal applied to the charge control FET 170.

Still referring to FIGS. 1 and 2, plot 200 shows increasing primary current between time t0 and t2; however, the rate of current flow is different between times t0 and t1 on one hand, and between times t1 and t2 on the other hand. In the example operation shown by FIG. 2, the rate of primary current is higher in times t0 to t1 reflecting that energy is being stored in the field of the second winding 144 simultaneously with charging capacitor 188 in the auxiliary circuit 106. The primary current makes a step change at time t1, reflecting that the charge control FET 170 becomes non-conductive and thus charging of the capacitor 188 in the auxiliary circuit 106 ceases in the example case at time t1.

At time t2 in the plots, the main FET 124 is made non-conductive as shown by the gate voltage of plot 206. Thus, the primary current $I_{PRI}$ falls off between times t2 and t4 as shown by plot 200. As soon as the main FET 124 becomes nonconductive, the polarity of the voltage on the secondary winding 144 reverses, and thus current begins to flow in the secondary circuit 104, as shown by plot 202 between times t2 and t5. That is, the current initially ramps up (between times t2 and t4), and at time t4 in the example system the secondary FET 152 becomes conductive as shown by the gate voltage plot 208. The current flowing in the secondary circuit 104 thus produces output voltage $V_{OUT}$ and charges the capacitor 150 of the secondary circuit 104 to provide current to the load (not specifically shown). At example time t5 the energy in the field associated with the secondary winding 144 has fully dissipated or collapsed, and thus the secondary FET 152 is made non-conductive at time t5 as shown by plot 208. The process repeats starting at time t7; however, before the time t7 the voltage stored on the parasitic capacitance 136 of the main FET 124 is discharged by operation of the auxiliary circuit 106. That is, various embodiments are directed to reducing voltage across a main FET 124 in the primary circuit 102 by coupling the inductor $L_{DD}$ 186 and capacitor 188 to the auxiliary winding 160 to create a voltage on the primary winding 110 of the transformer 108.

Still referring simultaneously to FIGS. 1 and 2, and particularly plot 204. During periods of time when the main FET 124 is conductive, the main FET 124 couples the switch node 122 to ground through the sense resistor 132. Thus, between times t0 and t2 the voltage at the switch node 122 is effectively zero. However, when the main FET 124 becomes non-conductive at time t2, current continues to flow in the primary circuit 102 because of the magnetizing inductance LM 114 (and to a lesser extent the leakage inductance Llk1 112). The current flowing between time t2 and t4 initially charges the parasitic capacitance 136 of the main FET 124. When the snubber diode 138 becomes forward biased, the current flows into the RC network comprising resistor 140 and capacitor 142. The current flow caused by the inductances thus creates a voltage at the switch node 122 as shown by plot 204. The peak voltage at point 214 is the sum of the input voltage $V_{DC}$ and the voltage across the snubber capacitor 142. As shown, the voltage at the switch node 122 rings slightly just after time t4 based on the interaction of the leakage inductance with the various capacitances in the primary circuit 102 (e.g., parasitic capacitance 136 of the main FET 124). Also, the voltage at the switch node 122 rings (beginning at time t5) when the current in the secondary winding 144 ceases. Nevertheless, as shown in plot 204 the voltage at the switch node 122 (i.e., the voltage across the main FET 124) is non-zero at times t5 and t6.

In order to reduce the voltage at the switch node 122 prior to the next energy storage cycle, example embodiments reduce the voltage across a main FET (i.e., reduce the voltage at the switch node 122) by coupling the inductor $L_{DD}$ 186 and capacitor 188 of the auxiliary circuit 106 to the auxiliary winding 160. In particular, in the example system between times t6 and t7 the gate of the resonance FET 172 is asserted and thus the resonance FET 172 becomes conductive. Thus, current may flow from the capacitor 188, through the inductor $L_{DD}$ 186, through resonance FET 172, through the body diode 194 of the charge control FET 170, and to the auxiliary winding 160 of the transformer 108. Making the resonance FET 172 conductive thus electrically couples the inductor $L_{DD}$ 186 and capacitor 188 of the auxiliary circuit 106 to the primary circuit 102 through the transformer 108. The parasitic capacitance 136 thus interacts not only with the inductances of the primary circuit 102, but also interacts with the inductor $L_{DD}$ 186 and capacitance 188 of the auxiliary circuit 106. That is, at time t6 the parasitic capacitance 136 begins to resonate with the noted inductances in the primary circuit 102 and the inductor $L_{DD}$ 186 of the auxiliary circuit 106. The time period t6 to t7 represents a half cycle of the resonance period, and the lowest voltage achieved takes the switch node 122 voltage (i.e., the voltage across the main FET 124) to effectively zero (e.g., within a range of voltages between 100 milli-Volts (mV) and −100 mV inclusive, or within a range of voltages between 50 mV and −50 mV inclusive). At the point in time when the switch node 122 voltage is at or near zero volts (i.e., at time t7), the energy storage cycle begins again with assertion of the gate of the main FET 124 and, in the example shown, assertion of the gate of the charge control FET 170. Thus, the energy storing step is repeated anew.

The time period t5 to t6 is shown to be a complete cycle in the first resonance period; however, in other cases the discharging the parasitic capacitance 136 may begin as soon as the current in the secondary circuit 104 reaches zero (i.e., precisely at time t5). In other cases, the first resonance period may be maintained for multiple cycles of the first resonance period, and thus the time period t5 to t6 may be extended. The specification now turns to a more detailed discussion of the various resonance periods.

Figure 3:
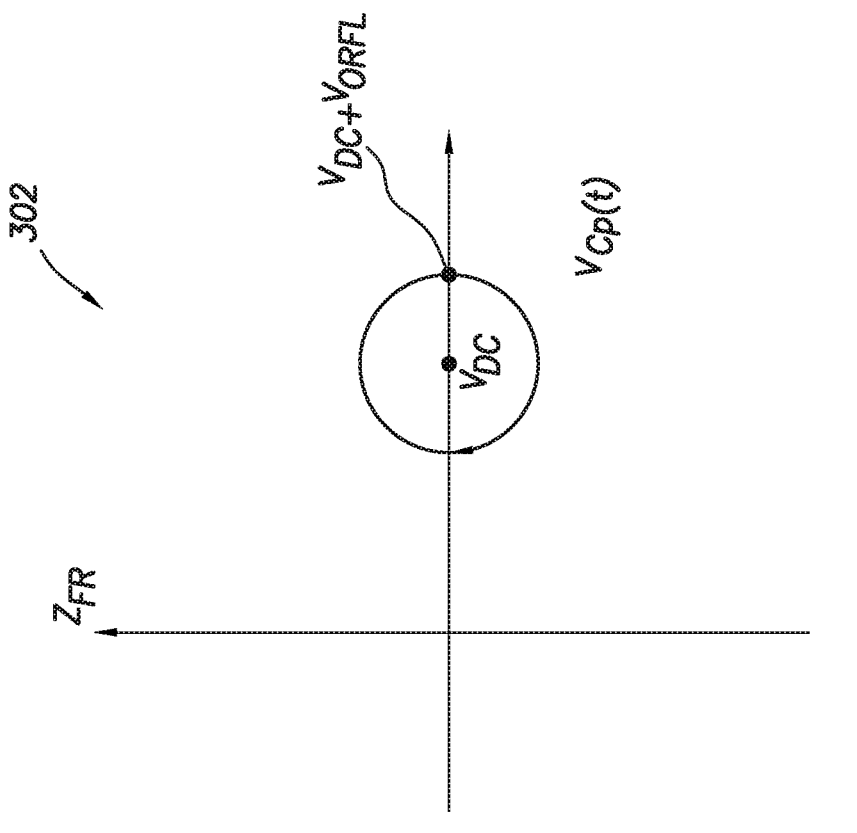
FIG. 3 shows an equivalent circuit during a first resonance period on the left, and shows a resonance coordinates plot on the right, both in accordance with at least some embodiments.
Figure 3:
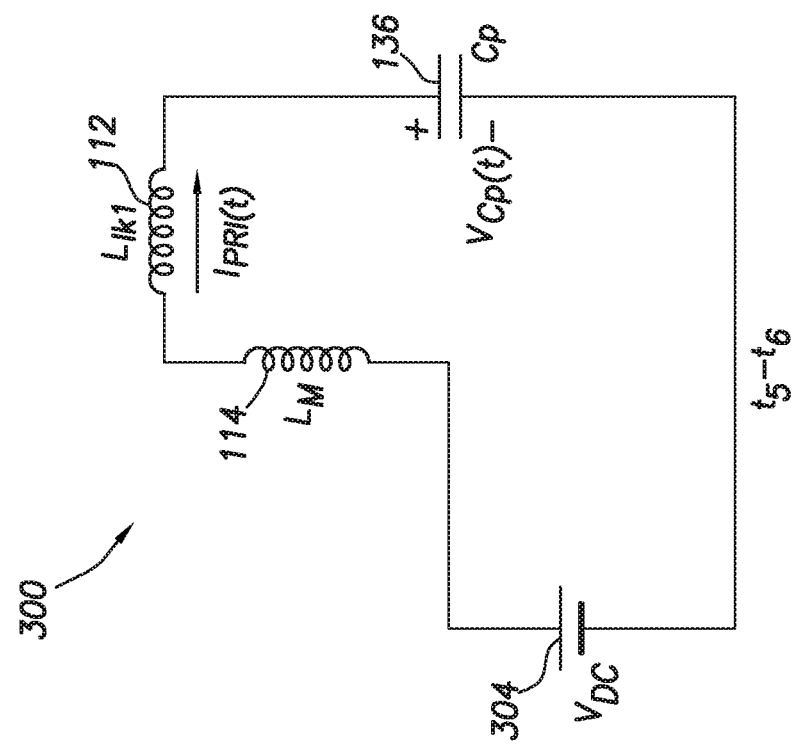

Consider the first resonance period (i.e., the time period t5 to t6) when the resonance FET 172 is non-conductive. During the first resonance period the parasitic capacitance 136 is effectively coupled in series with the magnetizing inductance $L_M$ 114 and the leakage inductance $L_{lk1}$ 112. FIG. 3 shows an equivalent circuit during the first resonance period on the left, and shows a resonance coordinates plot on the right. In particular, FIG. 3 shows equivalent circuit 300 with a battery 304 (representative of the input voltage $V_{DC}$) in series with magnetizing inductance $L_M$ 114, leakage inductance $L_{lk1}$ 112, and parasitic capacitance $C_P$ 136. For reasons that will become clear below, the order of the magnetizing inductance 114 and the leakage inductance 112 is reversed in comparison to the circuit of FIG. 1. Also labeled within the figure is the primary current $I_{PRI}$ as a function of time (t) ($I_{PRI}(t)$). The equivalent circuit has a resonant frequency that results in a time-varying voltage across the parasitic capacitance $C_P$ (labeled $VC_P(t)$). The resonant frequency of the equivalent circuit 300 can be calculated according to the following equation:

$$\omega_{FR} = 1/\sqrt{C_P \cdot (L_m + L_{lk1})} \quad (1)$$

where $\omega_{FR}$ is the resonant frequency for the first resonance period (in radians per second), $C_P$ is the parasitic capacitance 136, $L_M$ is the magnetizing inductance 114, and $L_{lk1}$ is the leakage inductance 112. The impedance during the first resonance period can be calculated according to the following equation:

$$Z_{FR} = \sqrt{\frac{L_M + L_{lk1}}{C_P}} \quad (2)$$

where $Z_{FR}$ is the impedance in the first resonance period, and the balance of the parameters are as defined above. The voltage across the parasitic capacitance as a function of time can be shown to be:

$$VC_P(t) = \frac{N_P}{N_S} V_{OUT} \cos(\omega_{FR} t) + V_{DC} \quad (3)$$

where $VC_P(t)$ is the voltage across the parasitic capacitance $C_P$ as a function of time t, $N_P$ is the number of primary winding turns, $N_S$ is the number of secondary winding turns, $V_{OUT}$ is the output voltage, $V_{DC}$ is the input voltage, and the balance of the parameters are as defined above.

The plot 302 shows a resonance coordinates plot for the equivalent circuit 300. In particular, the resonance coordinates plot 302 shows that the resonance during this first resonance period is centered at $V_{DC}$, and has an amplitude being the output voltage as reflected across the transformer (i.e., $V_{ORFL}$).

Figure 4:
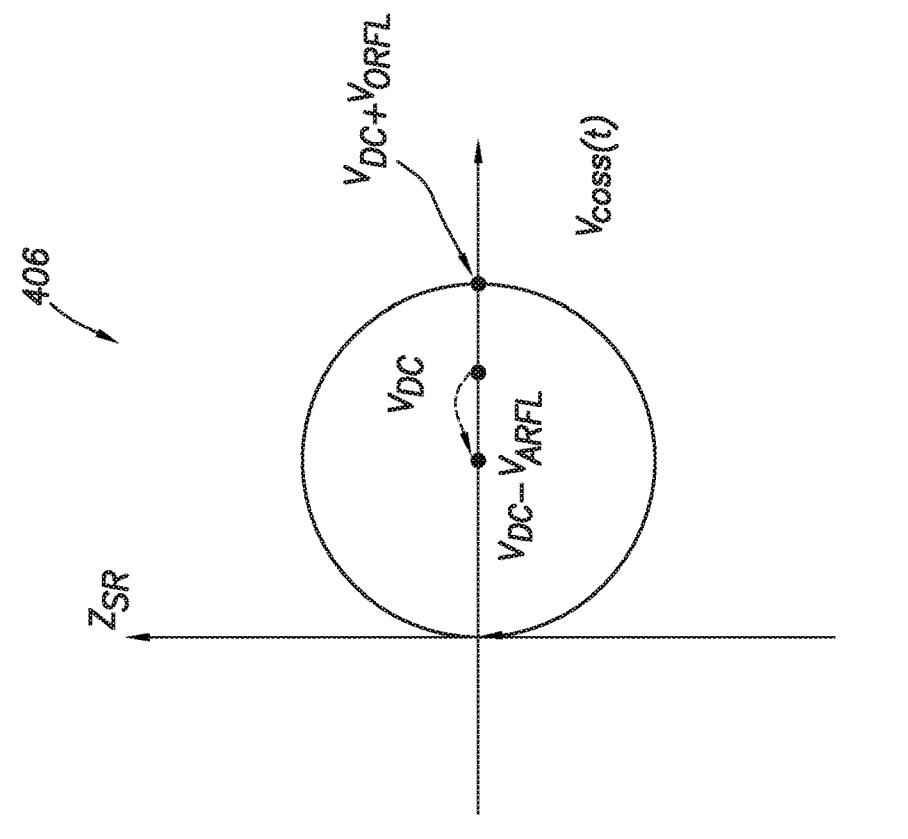
FIG. 4 shows an equivalent circuit during a second resonance period on the left, and shows a resonance coordinates plot on the right, both in accordance with at least some embodiments.
Figure 4:
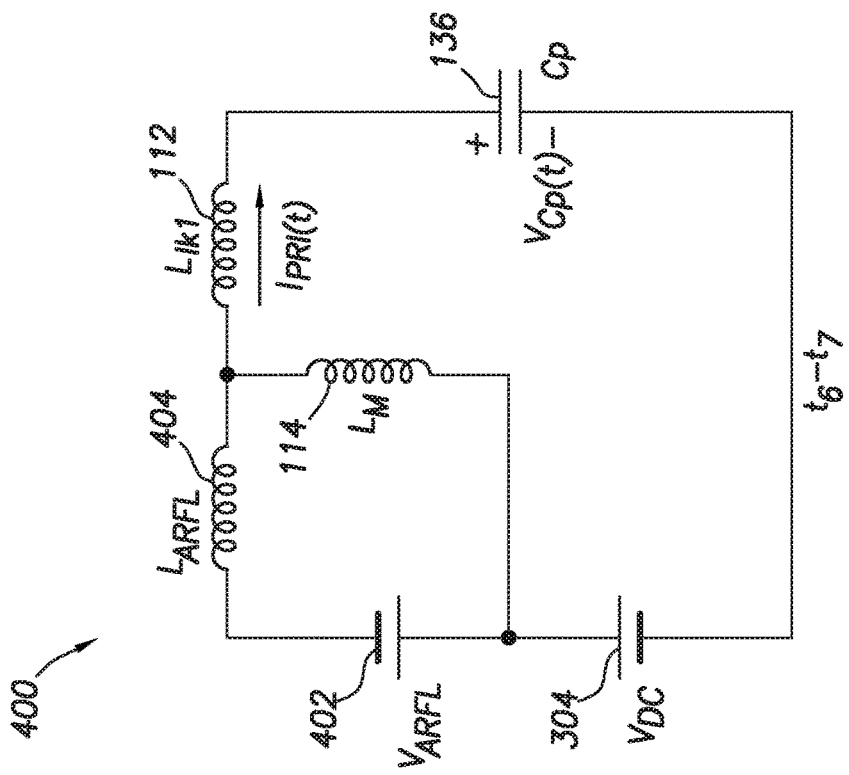

FIG. 4 shows an equivalent circuit during a second resonance period (i.e., time period t6 to t7) on the left, and shows a resonance coordinates plot on the right. In particular, FIG. 4 shows equivalent circuit 400 again with a battery 304 (representative of the input voltage $V_{DC}$) in series with magnetizing inductance $L_M$ 114, leakage inductance $L_{lk1}$ 112, and parasitic capacitance $C_P$ 136. During the second resonance period the resonance FET 172 (FIG. 1) of the auxiliary circuit 106 (FIG. 1) is conductive, and thus the inductor $L_{DD}$ 186 and capacitor 188 of the auxiliary circuit 106 (FIG. 1) are reflected across the transformer 108 (FIG. 1) to the primary circuit 102 (FIG. 1). The equivalent circuit 400 thus further contains a battery 402 (representative of the reflected voltage of the capacitor 188 (reflected voltage labeled $V_{ARFL}$)) and an inductor $L_{ARFL}$ 404 (reflected inductor $L_{DD}$ 186). As before, the equivalent circuit has a resonant frequency that results in the voltage $VC_P(t)$ across the parasitic capacitance $C_P$. The resonant frequency of the equivalent circuit 400 can be calculated according to the following equation:

$$\omega_{SR} \approx 1/\sqrt{C_P \cdot L_{ARFL}} \quad (4)$$

where $\omega_{sr}$ is the resonant frequency during the second resonance period (in radians per second), and $L_{ARFL}$ is the value of the reflected inductor $L_{DD}$ 186. Equation 4 is shown as approximate because the resonant frequency is controlled largely by the reflected inductance (i.e., the magnetizing inductance $L_M$ is large and thus is effectively shorted by the reflected inductance $L_{ARFL}$, and the leakage inductance $L_{lk1}$ is small). Similarly, the impedance during the second resonance period can be calculated according to the following equation:

$$Z_{SR} \approx \sqrt{\frac{L_{ARFL}}{C_P}} \quad (5)$$

where $Z_{SR}$ is the impedance in the second resonance period. Equation 5 is shown as approximate because the impedance is controlled largely by the reflected inductance. The voltage across the parasitic capacitance as a function of time during the second resonance period can be shown to be:

$$VC_P(t) = \left(\frac{N_P}{N_S} V_{OUT} + \frac{N_P}{N_A} V_{DD}\right) \cos(\omega_{SR} t) + V_{DC} - \frac{N_P}{N_A} V_{DD} \quad (6)$$

where again $VC_P(t)$ is the voltage across the parasitic capacitance $C_P$ as a function of time t, $N_A$ is the number of auxiliary winding turns, $V_{DD}$ is the voltage held on capacitor 188 (FIG. 1), and the balance of the parameters are as defined above. It is noted that $V_{ARFL}$ is $(N_P/N_A)*V_{DD}$.

The plot 406 shows a resonance coordinates plot for the equivalent circuit 400 during the time period t6 to t7 (FIG.

2, the second resonance period). In particular, switching in the inductor $L_{DD}$ 186 and capacitor 188 of the auxiliary circuit 106 (FIG. 1) not only shifts the resonance period down as shown in the resonance coordinates plot 406, but also increases the peak-to-peak voltage of the resonance (i.e., the circuit in 406 is faster and larger than circuit 302 (FIG. 3)). By controlling the voltage $V_{DD}$ across capacitor 188 (taking into account input voltage $V_{DC}$ and output voltage $V_{OUT}$), the peak-to-peak resonance can result in the voltage at the switch node 122 (i.e., the voltage of the parasitic capacitance 136 (FIG. 1)) being at near zero at certain times in the resonance. At the point in time where the switch node 122 voltage is at or about zero, the main FET 124 (FIG. 1) can be made conductive thus beginning anew storing energy in the field associated with secondary winding 144 (FIG. 1). The minimum switch node or minimum drain voltage experienced during the second resonance period can be shown to be:

$$V_{DRAIN-MIN} = V_{DC} - \frac{N_P}{N_S}V_{OUT} - 2\frac{N_P}{N_A}V_{DD} \qquad (7)$$

where $V_{DRAIN-MIN}$ is the minimum switch node or drain voltage during the second resonance, and the balance of the parameters are as defined above. If one considers that the turns ratios of the transformer are fixed for a particular power converter, the input voltage $V_{DC}$ is a direct function of the AC supply voltage, and that $V_{OUT}$ (though adjustable in some cases) is fixed for extended periods of time, the controlled parameter is thus the $V_{DD}$ (i.e., controlled by on time of the charge control FET 170 (FIG. 1)). Thus, in example embodiments the duty cycle of the control signal applied to the gate of the resonance FET 172 is controlled to achieve a $V_{DD}$ that results in $V_{DRAIN-MIN}$ reaching zero during the second resonance period.

Returning briefly to FIG. 2. Assuming a $V_{DD}$ that results in the switch node 122 reaching zero volts during certain times of the second resonance period, the next consideration is the asserted time of the gate of the resonance FET 172 (or stated otherwise, the conduction time of the resonance FET 172). In FIG. 2, the asserted time is the time period of t6 to t7. Although it is possible to allow the second resonance to ring back and forth for several cycles before making the main FET 124 (FIG. 1) conductive to begin the next charging cycle, in example cases the main FET 124 is made conductive at the first $V_{DRAIN-MIN}$ after assertion of the resonance FET 172 (e.g., turn on the main FET 124 half way through the resonance—the resonance half-period). The resonance half-period of the second resonance can be shown to be:

$$T_{ZVS} \approx \pi\sqrt{C_P \cdot \left(\frac{N_P}{N_A}\right)^2 L_{DD}} \qquad (8)$$

where $T_{ZVS}$ is the resonance half-period period of oscillation of the second resonance, and the balance of the parameters are as defined above. Equation 8 is shown as approximate because the leakage effect of the leakage inductance $L_{IK1}$ is ignored. If the first $V_{DRAIN-MIN}$ after assertion of the resonance FET 172 is to be used, the asserted time of the gate signal to the resonance FET 172 is thus $T_{ZVS}$. In some example cases, to make the primary controller (discussed more below) more simple, the time period between assertion of the gate of the resonance FET 172 and assertion of the main FET 124 is fixed (i.e., a predetermined fixed time), and the designer is tasked with choosing a value for the inductor $L_{DD}$ 186 that ensures that the $V_{DRAIN-MIN}$ is met in the predetermined fixed time. In other cases, the primary controller may monitor the switch node 122 voltage and make the main FET 124 conductive when zero volts at the switch node 122 is reached. Zero volts is oftentimes difficult to detect with devices constructed on silicon, and reaction time of circuits is non-zero, and thus in other cases the primary controller may monitor the switch node 122 voltage and predictively assert gate signal to the main FET 124 when the switch node 122 voltage falls through a predetermined non-zero voltage.

Returning to FIG. 1, the various embodiments discussed to this point have described an example circuit, and operation of that example circuit, that achieves ZVS for the main FET 124 based on switching in additional components in the auxiliary circuit 106 to affect the resonance frequency and the peak-to-peak voltage of the resonance. Thus, ZVS is achieved with a primary circuit 102 having a single FET in the main power flow path. The discussion now turns to a more detailed discussion of a circuit with a primary controller designed and constructed to implement the various example embodiments.

Figure 5:
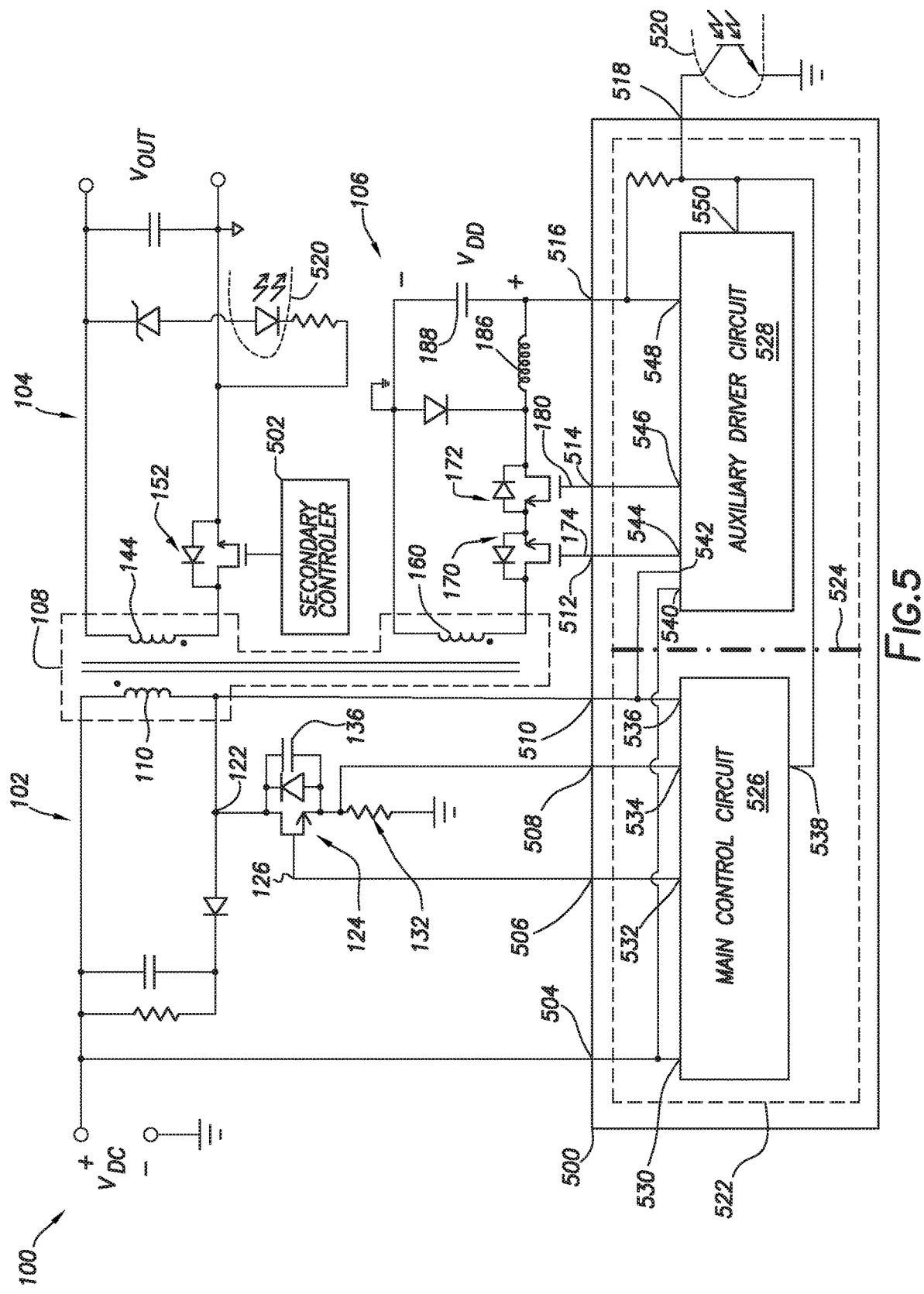
FIG. 5 shows a power converter in accordance with at least some embodiments.

FIG. 5 shows a power converter in accordance with at least some embodiments. In particular, FIG. 5 shows the power converter 100 including the primary circuit 102, the secondary circuit 104, and the auxiliary circuit 106. Transformer 108 is shown in a simplified form without the various leakage and magnetizing inductances. The auxiliary circuit 106 is flipped in comparison to FIG. 1 to put the charge control FET 170 and the resonance FET 172 at the bottom of the circuit, but the auxiliary circuit 106 is electrically the same as FIG. 1. FIG. 5 further shows a primary controller 500 and a secondary controller 502. The secondary controller 502 controls the secondary FET 152, and any suitable secondary controller 502 currently available or after developed may be used.

The primary controller 500 may be a packaged semiconductor or integrated circuit device with various electrical connections (e.g., terminals or pins) available outside the semiconductor packaging. In the example system, the primary controller 500 defines an input voltage sense terminal 504, a main gate terminal 506, a current sense terminal 508, a switch node terminal 510, a charge gate terminal 512, a resonance gate terminal 514, a $V_{DD}$ sense terminals 516, and an output sense terminal 518. Various other terminal will also be present (e.g., ground terminal, terminal(s) to set the operating frequency), but the additional terminals are not shown so as not to unduly complicate the figure.

The voltage sense terminal 504 couples to the input voltage $V_{DC}$ to enable the primary controller 500 to sense the presence and magnitude of the input voltage $V_{DC}$. The main gate terminal 506 couples to the gate 126 of the main FET 124 to enable the primary controller 500 to make the main FET 124 conductive and non-conductive. The current sense terminal 508 couples between the main FET 124 and the current sense resistor 132 to enable the primary controller 500 to sense primary current in the primary winding 110 during periods of time when the main FET 124 is conductive. The switch node terminal 510 couples to the switch node 122 to enable the primary controller 500 to sense the voltage at the switch node 122 (and thus the voltage on the parasitic capacitance 136). The charge gate terminal 512 couples to the gate 174 of the charge control FET 170 to enable the primary controller 500 to make the charge control FET 170 conductive and non-conductive. The resonance gate terminal 514 couples to the gate 180 of the resonance FET 172 to enable the primary controller 500 to make the resonance FET 172 conductive and non-conductive. The $V_{DD}$ sense terminal 516 couples to the positive side of the $V_{DD}$ voltage held on capacitor 188 to enable the primary controller 500 to draw operational power as well as control the on time or duty cycle of the charge control FET 170 as discussed above. Finally, the output sense terminal 518 in the example system couples to a transistor of an optocoupler 520, and the light emitting diode (LED) of the optocoupler 520 is coupled across the output voltage $V_{OUT}$ as shown. Thus, the primary controller 500 can sense the output voltage $V_{OUT}$ as part of the primary current control, as well sensing the output voltage $V_{OUT}$ as part of controlling the charge control FET 170 to ensure the $V_{DRAIN-MIN}$ reaches zero during the second resonance period as discussed above.

In some example systems the primary controller 500 is implemented on a single substrate of semiconductor material, as shown by substrate 522 in dashed lines. However, in other cases the primary controller 500 may be a multichip module comprising several distinct semiconductor substrates in a single package, as illustrated by the two regions of the substrate 522 created by dash-dot-dash line 524.

Still referring to FIG. 5, the example primary controller 500 conceptually defines a main control circuit 526 and an auxiliary driver circuit 528. In example cases, the main control circuit 526 may be defined on the same substrate 522 as the auxiliary driver circuit 528, and the two illustrative circuits may be intermingled. In other cases the main control circuit 526 may be defined on a separate and discrete substrate from the substrate on which the auxiliary driver circuit 528 is defined (as implied by dash-dot-dash line 524). The main control circuit 526 defines voltage sense input 530, a main gate output 532, a current sense input 534, a switch node sense input 536, and an output voltage sense input 538. The voltage sense input 530 is coupled to the input voltage sense terminal 504 and thus the input voltage $V_{DC}$. The main gate output 532 is coupled to the main gate terminal 506 and thus gate 126 of the main FET 124. The current sense input 534 is coupled to the current sense terminal 508 and is thus coupled to sense the voltage developed across the current sense resistor 132 (proportional to primary current when the main FET 124 is conductive). The switch node sense input 536 is coupled to the switch node terminal 510 and thus the switch node 122. The output voltage sense input 538 is coupled to the output sense terminal 518 and thus enables the main control circuit 526 to sense a value proportional to output voltage $V_{OUT}$.

The auxiliary driver circuit 528 defines a voltage sense input 540, a switch node sense input 542, a charge gate output 544, a resonance gate output 546, a $V_{DD}$ sense input 548, and an output voltage sense input 550. In the example system the voltage sense input 540 is coupled to the input voltage sense terminal 504 and thus the input voltage $V_{DC}$. The switch node sense input 542 is coupled to the switch node terminal 510 and thus the switch node 122. In the example system the charge gate output 544 is coupled to the charge gate terminal 512. In the example system, the resonance gate output 546 is coupled to the resonance gate terminal 514. The example $V_{DD}$ sense input 548 is coupled to the $V_{DD}$ sense terminal 516. And the output voltage sense input 550 is coupled to the output sense terminal 518.

The example primary controller 500 is designed and constructed to control operation of the primary circuit 102 as well as the auxiliary circuit 106 in the manner discussed in the timing diagram of FIG. 2. More specifically, the example primary controller 500 is configured to store energy in a field associated with the secondary winding 144 of the transformer 108 by making the main FET 124 conductive (by asserting the main gate terminal 506) and thereby creating current in the primary winding 110. Simultaneously with storing energy in the field associated with the secondary winding 144, the example primary controller 500 (particularly the example auxiliary driver 528) charges the capacitor 188 of the auxiliary circuit 106 by making the charge control FET 170 conductive (by asserting the charge gate terminal 512). As mentioned previously, the primary controller 500 (particularly the auxiliary circuit 106) may further control the voltage $V_{DD}$ developed on the capacitor 188 by controlling the duty cycle of the signal created on the charge gate output 544 and thus the charge gate terminal 512. Once the storage of the energy in the field associated with the secondary winding has completed (or stated another way, the current in the primary winding reaches a predetermined peak value), the example primary controller 500 discharges the energy into the secondary circuit 104 by making the main FET 124 non-conductive (by de-asserting the main gate terminal 506).

Further still, in relation to ZVS operation of the main FET 124, the example primary controller 500 is further designed and constructed to reduce the voltage across the main FET 124 prior to the next conductive cycle by coupling capacitor 188 of the auxiliary circuit 106 to the auxiliary winding 160 by making the resonance FET 172 conductive (by asserting the resonance gate output 546 and thus the resonance gate terminal 514 in FIG. 5). In some example cases, the assertion of the resonance gate output 546 is for a fixed and predetermined period of time, and the circuit designer is charged with selecting an inductor $L_{DD}$ 186 to create a resonant frequency (during the second resonance period) that enables the parasitic capacitance 136 to be at or near zero within the fixed period of time.

Still referring to FIG. 5, with respect to operation of the charge control FET 170 and resonance FET 172, the various embodiments discussed to this point have assumed that the two FETs are separately controlled (i.e., separate and distinct charge gate output 544 and resonance gate output 546). However, in order to simplify the design and construction of the primary controller 500, it turns out a single gate output (and thus in some cases a single gate terminal) can be used to control both the charge control FET 170 and resonance FET 172. That is, during periods when the capacitor 188 is being charged and thus the charge control FET 170 is conductive, current flows through the body diode 192 (FIG. 1) of the resonance FET 172, and thus it is possible to likewise have the resonance FET 172 conductive. Similarly, during periods when the current from capacitor 188 is being applied to the auxiliary winding 160 and thus the resonance FET 172 is conductive, current flows through the body diode 194 (FIG. 1) of charge control FET 170, and thus it is possible to likewise have the charge control FET 170 conductive. Thus, the FETs can be made conductive and non-conductive simultaneously without adversely affecting operation of the auxiliary circuit 106 either during the charging of the capacitor 188 or the second resonance period. Thus, though shown as separate gate outputs and separate terminals, the charge gate terminal 512 and resonance gate terminal 514 may be the same terminal. Likewise, though shown as separate outputs, the charge gate output 544 and resonance gate output 546 may be the same output.

Figure 6:
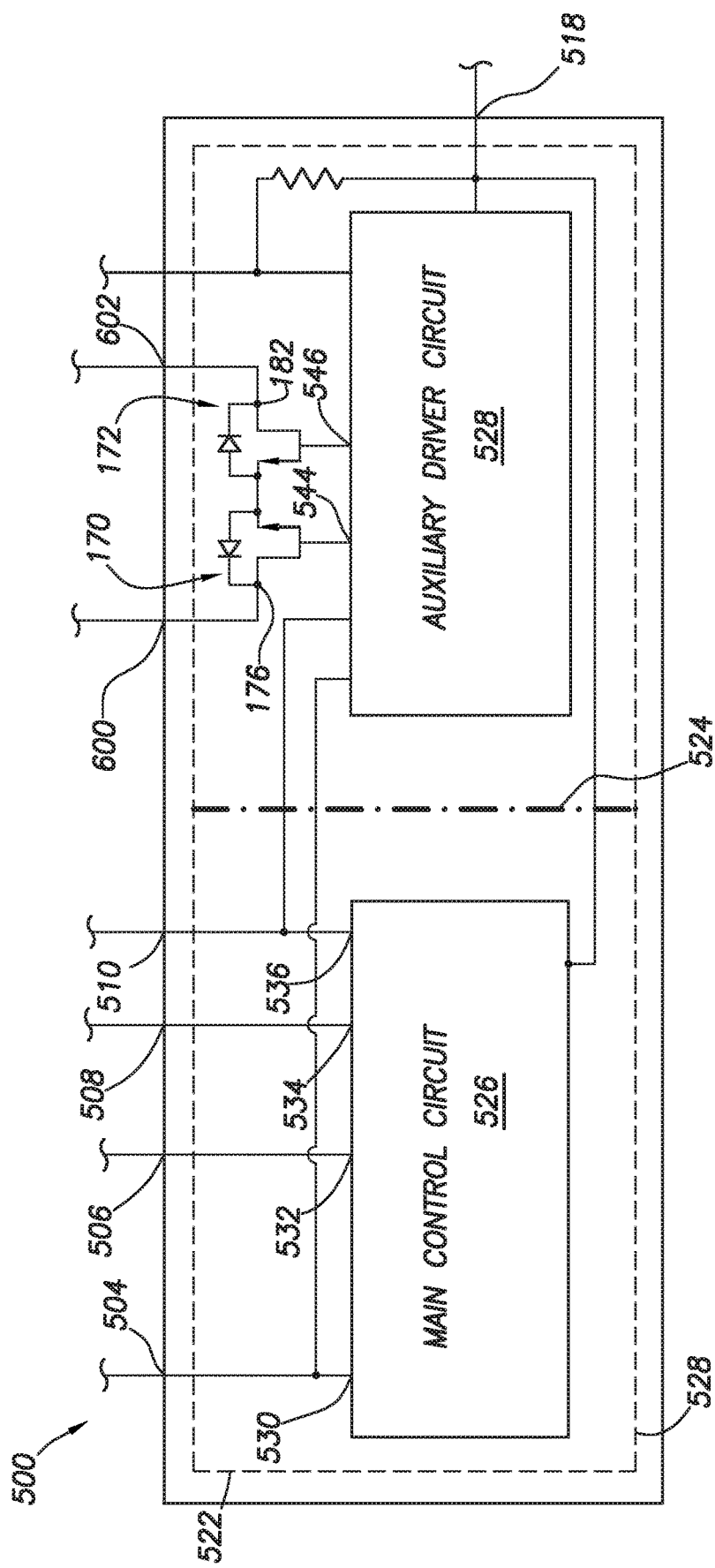
FIG. 6 shows a primary controller in accordance with at least some embodiments.

FIG. 6 shows a primary controller in accordance with at least some embodiments. In particular, FIG. 6 show an alternative primary controller 500 (without the attached power converter components) where the charge control FET 170 and resonance FET 172 are disposed within primary controller 500. In some example cases charge control FET 170 and resonance FET 172 can be constructed on the same semiconductor substrate 522 with the main control circuit 526 and auxiliary driver circuit 528. In other cases the auxiliary driver circuit 528, charge control FET 170, and resonance FET 172 may be on a substrate separate and distinct from the substrate on which the main control circuit 526 resides (as shown by the distinct areas created by dash-dot-dash line 524). Further still, the charge control FET 170 and resonance FET 172 may be on their own substrate as part of a primary controller 500 constructed as a multichip module.

The main control circuit 526 along with its inputs, its outputs, and respective externally accessible terminals may be the same as discussed with respect to FIG. 5, and thus the description will not be repeated here. With respect to the charge control FET 170 and resonance FET 172, moving the FETs to be disposed internal to the primary controller 500 changes the terminal configuration. In particular, the example primary controller 500 of FIG. 6 defines a first switch terminal 600 coupled to the drain or first connection 176 of the charge control FET 170, and the primary controller 500 of FIG. 6 defines a second switch terminal 602 coupled to the first connection 182 of the resonance FET 172. Thus, when the example primary controller 500 of FIG. 6 is used, rather than coupling gate terminals to gates of the FETs in the auxiliary circuit 106 (FIG. 1), the FETs are coupled into the auxiliary circuit 106 by way of the first and second switch terminal 600 and 602. The operation of the overall power converter 100 (FIG. 1) remains the same, and thus will not be repeated here so as not to unduly lengthen the specification. Having the charge control FET 170 and resonance FET 172 as integral components of the primary controller 500 reduces the overall bill of materials count, yet still enables control and ZVS operation as discussed above.

In the example primary controller 500 of FIG. 6, the auxiliary driver circuit 528 defines separate charge gate output 544 and resonance gate output 546; however, as discussed above the charge control FET 170 and resonance FET 172 may be made conductive and non-conductive simultaneously, and thus a single gate output may be used.

The example auxiliary circuits 106 of FIGS. 1 and 5 use one or two terminals of the primary controller 500 to drive the gates of the charge control FET 170 and resonance FET 172, and one terminal to sense $V_{DD}$. The example auxiliary circuit 106 that would be associated with the FIG. 6 would use two terminal terminals to couple in the charge control FET 170 and resonance FET 172, and one terminal to sense $V_{DD}$. However, other alternative arrangements are possible, and some of the alternative arrangements result in reduced number of terminals of the primary controller 500 associated with the auxiliary circuit 106.

Figure 7:
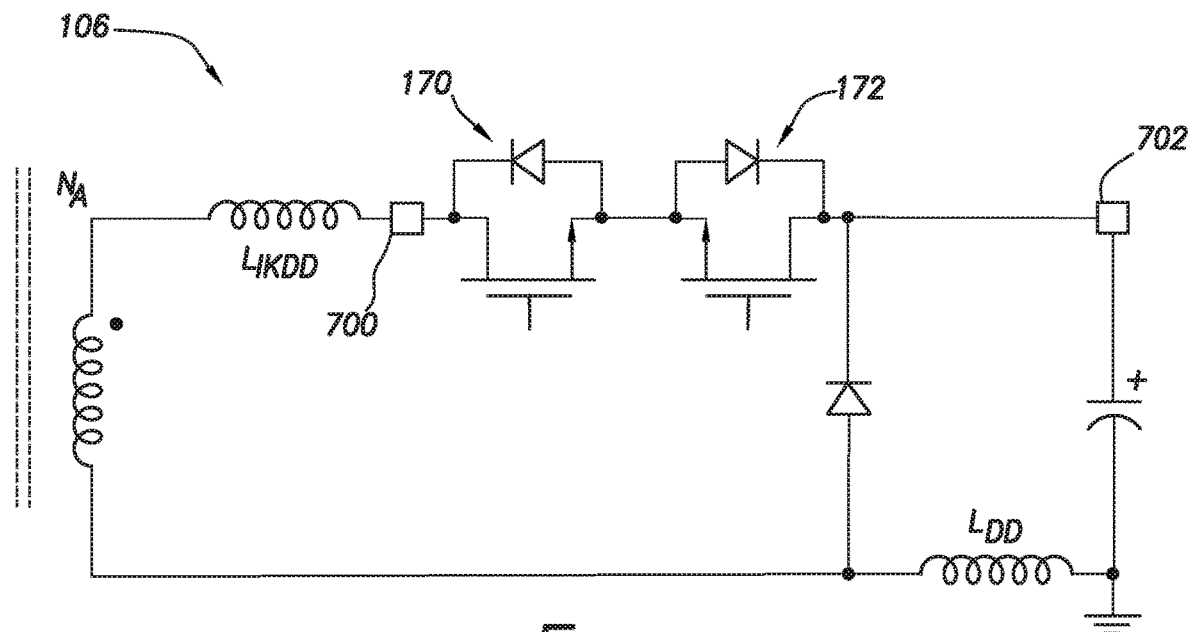
FIG. 7 shows an auxiliary circuit in accordance with at least some embodiments.

FIG. 7 shows an auxiliary circuit in accordance with at least some embodiments. In particular, FIG. 7 shows an arrangement where the charge control FET 170 and resonance FET 172 are disposed within the primary controller 500 (FIG. 6), and by relocating the inductor $L_{DD}$ 186 only two terminals 700 and 702 are needed to couple the FETs into the auxiliary circuit 106. Moreover, in the auxiliary circuit of FIG. 7 the gates of the charge control FET 170 and resonance FET 172 may be floating gates.

Figure 8:
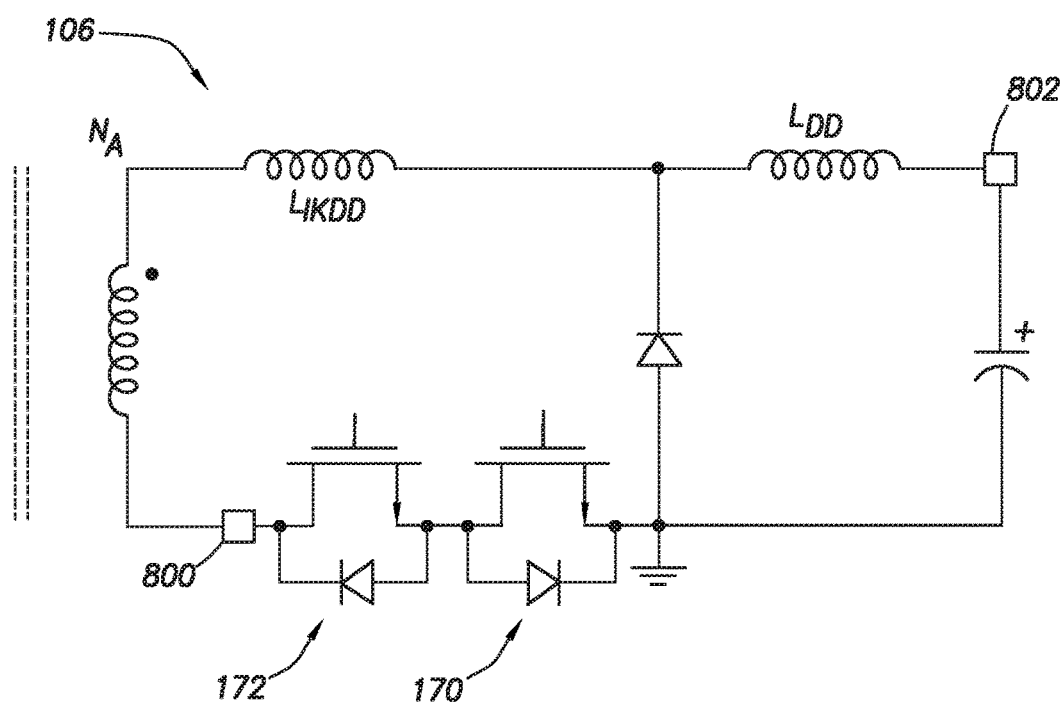
FIG. 8 shows an auxiliary circuit in accordance with at least some embodiments.

FIG. 8 shows an auxiliary circuit in accordance with at least some embodiments. In particular, FIG. 8 shows an arrangement where the charge control FET 170 and resonance FET 172 are disposed within the primary controller 500 (FIG. 6), and by relocating the location within the auxiliary circuit 106 where the FETs couple, only two terminals 800 and 802 are needed to couple the FETs into the auxiliary circuit 106 (relying on a ground terminal of the primary controller). Moreover, in the auxiliary circuit of FIG. 8 the gates of the charge control FET 170 and resonance FET 172 may be floating gates.

Figure 9:
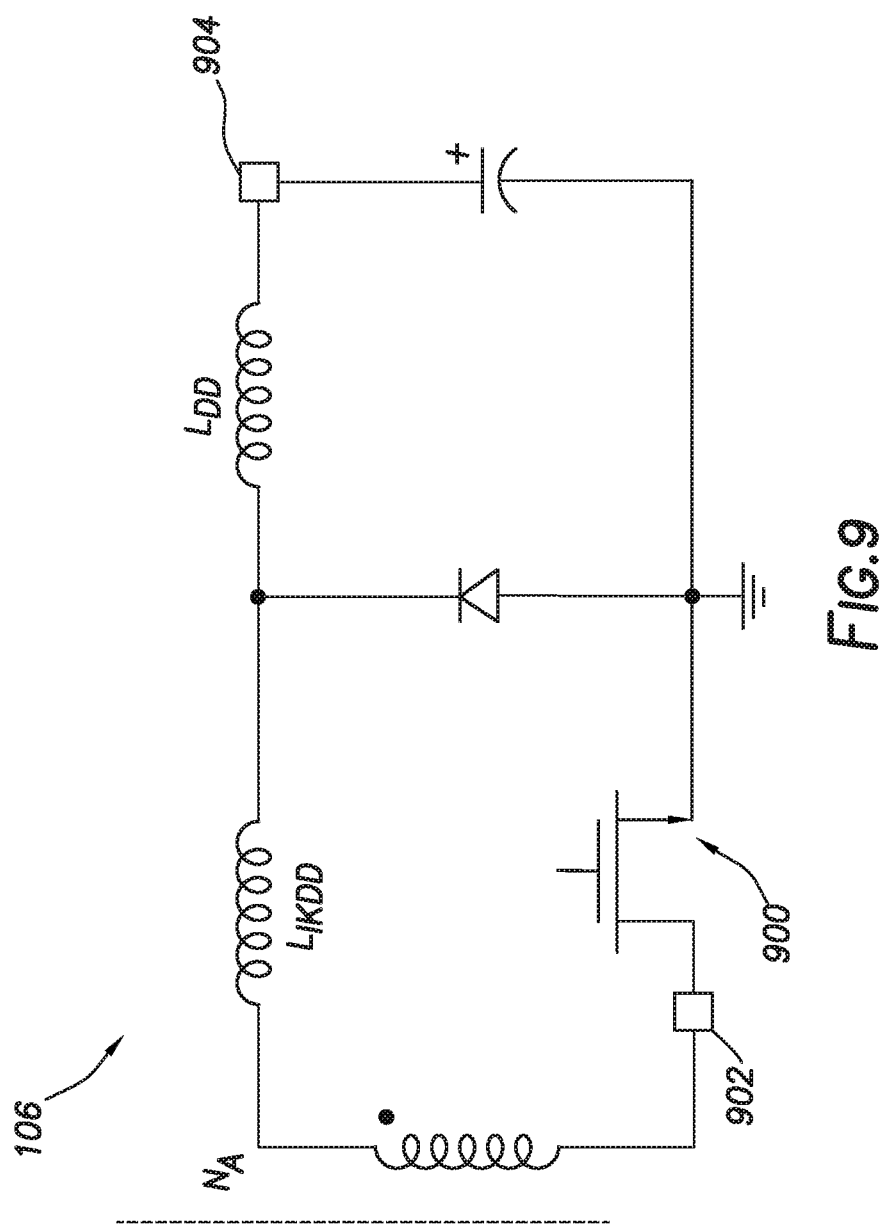
FIG. 9 shows an auxiliary circuit in accordance with at least some embodiments.

FIG. 9 shows an auxiliary circuit in accordance with at least some embodiments. In particular, FIG. 9 shows an arrangement where the charge control and resonance FETs are implemented as a single control FET 900, which does not have a body diode. In the example auxiliary circuit 106 of FIG. 9, only two terminals 902 and 904 are needed to couple the control FET 900 into the auxiliary circuit 106 (relying again on a ground terminal of the primary controller). Moreover, in the auxiliary circuit of FIG. 9 the gates of the control FET 900 may be a non-floating gate.

Figure 10:
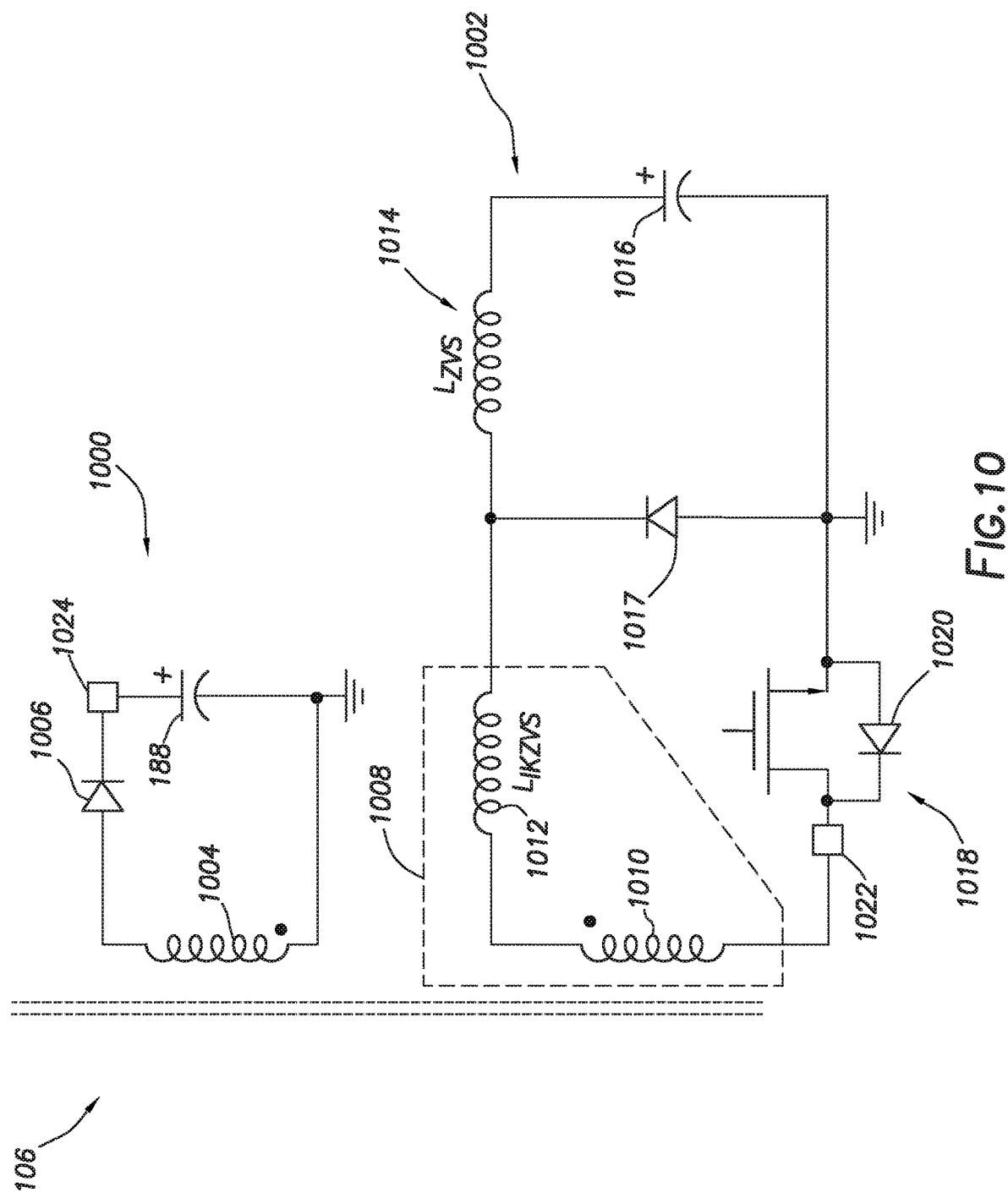
FIG. 10 shows an auxiliary circuit in accordance with at least some embodiments.

FIG. 10 shows an auxiliary circuit in accordance with at least some embodiments. In particular, FIG. 10 shows an arrangement where the auxiliary circuit 106 of the previous embodiments is functionally divided into $V_{DD}$ circuit 1000 and a ZVS circuit 1002. Referring initially to the $V_{DD}$ circuit 1000, the winding 1004 is coupled in series with diode 1006 and capacitor 188. The second end of the winding 1004 and the second side of the capacitor 188 are coupled to ground of the primary circuit 102 (FIG. 2). The example $V_{DD}$ circuit 1000 is arranged for flyback operation, charging the capacitor 188 to provide the $V_{DD}$ voltage for powering the various components of the primary controller 500 (FIG. 1). In the embodiment of FIG. 10, however, the $V_{DD}$ voltage is not controlled or controllable by the primary controller 500 (beyond controlling the primary current in the charging phase), and thus the example circuit of FIG. 10 may be useful in situations where the output voltage $V_{OUT}$ (FIG. 1) remains within a narrow range of voltages (e.g., 5V to 12V).

The ZVS circuit 1002 comprises an additional winding 1008 illustratively shown to include an ideal winding 1010 and a leakage inductance 1012. A first lead of the winding 1008 couples to a first lead of the inductance $L_{ZVS}$ 1014. The second lead of the inductance $L_{ZVS}$ 1014 couples to a first end of capacitor 1016. The second end of the capacitor 1016 couples to ground of the primary circuit 102 (FIG. 1). Diode 1017 has an anode coupled to ground, and a cathode coupled the first end of the inductance $L_{ZVS}$ 1014. The example circuit of FIG. 10 further comprises control switch 1018 illustratively shown as a FET (and hereafter just control FET 1018). The control FET 1018 serves dual functions in the example circuit. During periods of time when the main FET 124 (FIG. 1) is conductive thus energy is being stored in the field associated with the secondary winding 144 (FIG. 1) and energy is being stored in the field associated with winding 1004, the control FET 1018 is conductive to charge capacitor 1016 (or, the control FET 1018 may remain non-conductive yet current flows through the body diode 1020). When electrical current flowing through the secondary winding 144 reaches a predetermined low level (e.g., zero) (such as at time t5 of FIG. 2), the primary controller 500 again may make the control FET 1018 conductive, which couples the voltage stored on capacitance 1016 to the winding 1008. As discussed with respect to the previous embodiments, coupling the capacitor 1016 (and inductance $L_{ZVS}$ 1014) to the winding 1008 sets up a resonance in the primary circuit 102 that results in reducing the voltage at the switch node 122 (FIG. 1) prior to the next charging cycle (as shown between time periods t6 and t7 of FIG. 2).

While control FET 1018 may be an individual circuit component in some cases, in other cases the control FET 1018 may be integral with the primary controller as discussed above, and in such cases only two terminals 1022 and 1024 are needed on the primary controller to implement the example circuit shown in FIG. 10. Moreover, in the example system of FIG. 10 the control FET 1018 may implement a non-floating gate.

Figure 11:
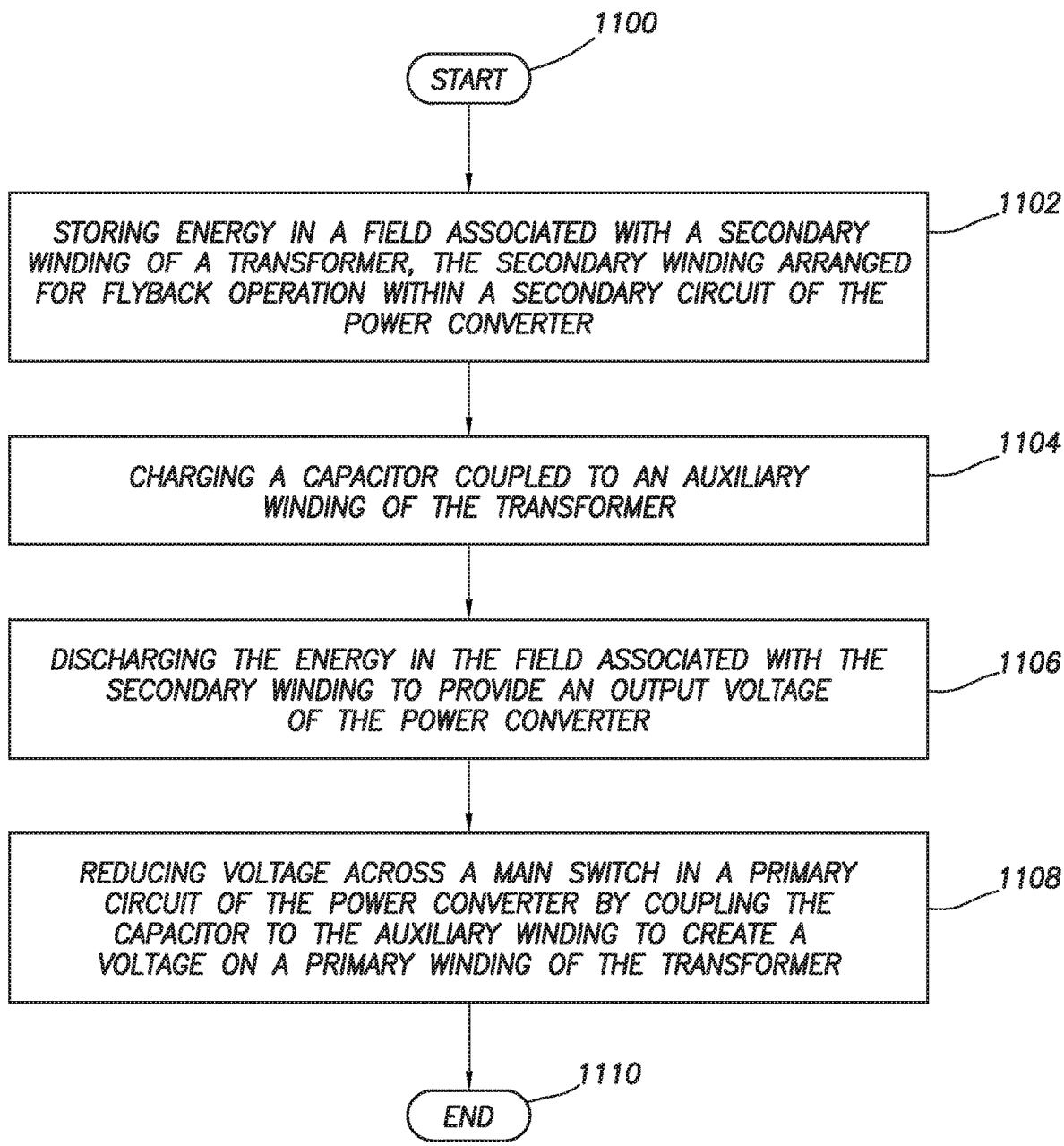
FIG. 11 shows a method in accordance with at least some embodiments.

FIG. 11 shows a method in accordance with at least some embodiments. In particular, the method starts (block 1100) and comprises: storing energy in a field associated with a secondary winding of a transformer, the secondary winding arranged for flyback operation within a secondary circuit of the power converter (block 1102); and simultaneously charging a capacitor coupled to an auxiliary winding of the transformer (block 1104); and then discharging the energy in the field associated with the secondary winding to provide an output voltage of the power converter (block 1106); and when the electrical current flowing through the secondary winding reaches a predetermined low level reducing voltage across a main switch in a primary circuit of the power converter by coupling the capacitor to the auxiliary winding to create a voltage on a primary winding of the transformer (block 1108). Thereafter the method ends (block 1110) to be restarted in the next switching cycle.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power converter, comprising:
   storing an energy in a field associated with a secondary winding of a transformer, the secondary winding arranged for flyback operation within a secondary circuit of the power converter;
   charging a capacitor coupled to an auxiliary winding of the transformer;
   discharging the energy in the field associated with the secondary winding to provide an output voltage of the power converter; and when an electrical current flowing through the secondary winding reaches a predetermined low level
   reducing a voltage across a main switch in a primary circuit of the power converter by:
      coupling an inductor and the capacitor in series to a first lead of the auxiliary winding to create a voltage on a primary winding of the transformer; and then
      de-coupling the inductor and the capacitor from the first lead of the auxiliary winding.

2. The method of claim 1 wherein reducing the voltage across the main switch further comprises resonating a capacitance in the primary circuit with the inductor.

3. The method of claim 2 wherein the capacitance further comprises a drain-to-source capacitance of the main switch in the form of a field effect transistor.

4. The method of claim 1 wherein charging the capacitor further comprises making a first auxiliary switch conductive, the first auxiliary switch coupled between the first lead of the auxiliary winding and the capacitor.

5. The method of claim 4 further comprising controlling a voltage developed on the capacitor by controlling a duty cycle of a control signal applied to the first auxiliary switch.

6. The method of claim 4:
   wherein coupling the inductor and the capacitor in series with the auxiliary winding further comprises making a second auxiliary switch conductive, the second auxiliary switch is coupled between the auxiliary winding and the capacitor;
   wherein de-coupling the inductor and the capacitor from the auxiliary winding further comprises making the second auxiliary switch non-conductive.

7. The method of claim 1 wherein coupling the inductor and the capacitor in series to the first lead further comprises coupling the capacitor to the first lead by making a second auxiliary switch conductive, the second auxiliary switch coupled between the first lead of the auxiliary winding and the capacitor.

8. The method of claim 1 wherein the reducing the voltage across the main switch begins when or after the electrical current flowing through the secondary winding reaches zero after discharging the energy in the field.

9. The method of claim 1:
   wherein reducing the voltage across the main switch further comprises reducing the voltage to a range of voltages between 100 milli-Volts (mV) and −100 mV, inclusive; and then further comprising
   repeating the storing energy step.

10. The method of claim 1 wherein resonating the capacitor in the primary circuit further comprises lowing a resonant frequency seen across the main switch.

11. The method of claim 1 wherein charging the capacitor further comprises charging the capacitor during the storing the energy in the field associated with the secondary winding.

12. A method of operating a power converter, comprising:
    storing an energy in a field associated with a secondary winding of a transformer, the secondary winding arranged for flyback operation within a secondary circuit of the power converter;
    charging a capacitor coupled to an auxiliary winding of the transformer by making a first auxiliary switch conductive, the first auxiliary switch coupled between a first lead of the auxiliary winding and the capacitor; and
    discharging the energy in the field associated with the secondary winding to provide an output voltage of the power converter; and when an electrical current flowing through the secondary winding reaches a predetermined low level
    reducing a voltage across a main switch in a primary circuit of the power converter by making a second auxiliary switch conductive, when conductive the second auxiliary switch couples the capacitor to the auxiliary winding to create a voltage on a primary winding of the transformer.

13. The method of claim 12 further comprising controlling a voltage developed on the capacitor by controlling a duty cycle of a control signal applied to the first auxiliary switch.

14. A power converter comprising:
    a primary circuit comprising:
       a primary winding of a transformer, the primary winding defining a first lead and a second lead, the first lead coupled to an input voltage;

a main switch defining a control input, a first connection, a second connection, the first connection coupled to the second lead of the primary winding, and the second connection coupled to ground on the primary circuit;
an auxiliary circuit comprising:
an auxiliary winding of the transformer;
a resonance switch defining a control input, the resonance switch coupled in series with the auxiliary winding;
an inductor coupled in series with the auxiliary winding;
a capacitor coupled in series with the auxiliary winding and the inductor;
a secondary circuit comprising:
a secondary winding of the transformer; and
a secondary switch, the secondary switch and the secondary winding arranged for flyback operation and configured to provide an output voltage of the power converter;
a primary controller comprising:
a main gate terminal coupled to the control input of the main switch;
an auxiliary driver circuit coupled to the control input of the resonance switch;
wherein the primary controller is configured to:
store energy in a field associated with the secondary winding of the transformer by driving an asserted signal to the main gate terminal;
discharge the energy in the field associated with the secondary winding to provide the output voltage of the power converter by driving a non-asserted state to the main gate terminal; and prior to a subsequent assertion of the main gate terminal
reduce voltage across the main switch by the auxiliary driver circuit asserting the control input of the resonance switch.

15. The power converter of claim 14:
wherein the auxiliary circuit further comprises a charge control switch defining a control input, the charge control switch coupled in series with the resonance switch;
wherein the auxiliary driver circuit is also coupled to the control input of the charge control switch, and the auxiliary driver circuit is configured to control a voltage developed on the capacitor by controlling duty cycle of a gate signal driven to the control input of the charge control switch.

16. The power converter of claim 15 wherein the primary controller further comprises a first switch terminal and a second switch terminal, the resonance switch and the charge control switch coupled directly in series and disposed within the primary controller, the first switch terminal coupled to a drain of the charge control switch, and the second switch terminal coupled to a drain of the resonance switch.

17. The power converter of claim 14 wherein when the primary controller reduces voltage across the main switch, the primary controller is configured to reduce the voltage across the main switch to a range of voltages between 100 milli-Volts (mV) and −100 mV, inclusive.

* * * * *